United States Patent [19]

Scholl et al.

[11] Patent Number: 4,870,151

[45] Date of Patent: Sep. 26, 1989

[54] POLYUREA-MODIFIED POLYETHERURETHANES AND THEIR USE AS EMULSION BREAKERS FOR WATER-IN-OIL EMULSIONS

[75] Inventors: Thomas Scholl, Meerbusch; Hermann Perrey, Krefeld; Thomas Augustin, Leverkusen; Christian Wegner, Köln, all of Fed. Rep. of Germany

[73] Assignee: Bayer Aktiengesellschaft, Leverkusen, Fed. Rep. of Germany

[21] Appl. No.: 250,295

[22] Filed: Sep. 28, 1988

Related U.S. Application Data

[63] Continuation of Ser. No. 156,784, Feb. 17, 1988, abandoned.

[30] Foreign Application Priority Data

Feb. 26, 1987 [DE] Fed. Rep. of Germany ....... 3706151

[51] Int. Cl.$^4$ .............................................. C08G 18/32
[52] U.S. Cl. ..................................... 528/49; 560/26; 560/115; 560/158; 252/358; 210/709; 210/735

[58] Field of Search .................... 528/49; 560/26, 115, 560/158; 252/358; 210/709, 735

[56] References Cited

U.S. PATENT DOCUMENTS

| | | | |
|---|---|---|---|
| 2,946,767 | 7/1960 | Gassmann | 260/47 |
| 4,314,924 | 2/1982 | Haubennestel et al. | 528/57 |
| 4,384,951 | 5/1983 | McCoy et al. | 208/188 |
| 4,535,111 | 8/1985 | Perrey et al. | 524/199 |

FOREIGN PATENT DOCUMENTS

| | | |
|---|---|---|
| 0139922 | 5/1985 | European Pat. Off. . |
| 0141081 | 5/1985 | European Pat. Off. . |
| 1081225 | 5/1960 | Fed. Rep. of Germany . |
| 2822908 | 7/1979 | Fed. Rep. of Germany . |

*Primary Examiner*—Maurice J. Welsh
*Attorney, Agent, or Firm*—Sprung Horn Kramer & Woods

[57] ABSTRACT

Specific new polyurea-modified polyetherurethanes and their uses as breakers for water-in-oil emulsions, in particular as breakers for water-in-oil emulsions.

3 Claims, No Drawings

POLYUREA-MODIFIED POLYETHERURETHANES AND THEIR USE AS EMULSION BREAKERS FOR WATER-IN-OIL EMULSIONS

This is a continuation of application Ser. No. 156,784 filed Feb. 17, 1988, now abandoned.

The invention relates to specific polyurea-modified polyetherurethanes and their use as breakers for water-in-oil emulsions, in particular as breakers for water-in-crude oil emulsions.

Mineral oil is predominantly extracted in the form of aqueous emulsions, mainly in the form of water-in-oil emulsions, which are generally stabilized by constituents of the mineral oil, and by co-extracted finely divided solids from the deposit. Salts, for example sodium chloride, calcium chloride and/or magnesium chloride, are frequently dissolved in the emulsified water. Transport costs, problems on account of higher viscosities of the emulsion and corrosion problems in the processing plants make it necessary to remove most of the water from the crude oil before its transport and/or before its processing, that is to break the extracted emulsion.

Such emulsions, which are often very stable, are generally broken by the addition of surface-active compounds, so-called demulsifiers-referred to as emulsion breakers in the following-often assisted by warming of the emulsion and/or additional application of electric fields.

The residual water content and the salt and solid content in the separated crude oil and the residual oil content in the separated water are decisive for the action of emulsion breakers. A minimization of these values, with simultaneous minimization of the application concentration, the duration of action and the application temperature of the emulsion breaker, is desired.

The products used hitherto for the breaking of crude oil emulsions, for example block polymers of ethylene oxide and/or 1,2-propylene oxide (U.S. Pat. No. 2,964,478), oxyalkylated phenol resins (U.S. Pat. No. 2,499,370 and U.S. Pat. No. 2,499,368) and block polymers or copolymers of ethylene oxide and 1,2-propylene oxide crosslinked by means of diisocyanates, dicarboxylic acids, formaldehyde and/or diglycidyl ether (EP-A No. 55,434 and EP-A 55,433), in general only partly fulfill the requirements. The emulsion breaking thus often proceeds slowly or incompletely if the temperatures are not relatively high. Known emulsion breakers are also only highly active in specific emulsions, are not generally utilizable and often are only sufficiently active in relatively high dosages.

The invention relates to new polyetherurethanes, suitable as emulsion breakers, of the general formula I:

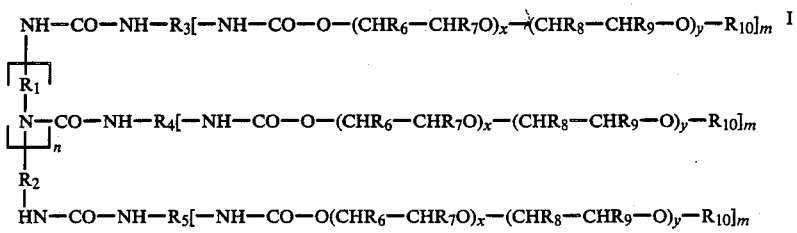

in which $R_1$ and $R_2$ independently of one another are selected from the group consisting of $C_2$ to $C_{14}$-alkylenes and $C_3$ to $C_{14}$-cycloalkylenes, $R_3$, $R_4$ and $R_5$ independently of one another are selected from the group consisting of substituted and unsubstituted alkylenes, substituted and unsubstituted cycloalkylenes and substituted and unsubstituted arylenes, $R_6$, $R_7$, $R_8$ and $R_9$ independently of one another are selected from the group consisting of hydrogen and $C_{1-20}$-alkyls, $R_{10}$ is selected from the group consisting of $C_1$ to $C_{18}$-alkyls, $C_6$ to $C_{18}$-aryls, $C_7$ to $C_{18}$-aralkyls and $C_2$ to $C_{18}$-alkenyls, n represents a number in the range of from 0 to 50, m represents a number in the range of from 1 to 4, x represents a number in the range of from 5 to 100 and y represents a number in the range of from 0 to 100.

Particularly suitable alkylene radicals $R_3$, $R_4$ and $R_5$ are those having 1 to 18 C-atoms, particularly suitable cycloalkylene radicals $R_3$, $R_4$ and $R_5$ are those having 5 or 6 ring carbon atoms and particularly suitable arylene radicals $R_3$, $R_4$ and $R_5$ are phenylene and naphthylene radicals, where the radicals mentioned can contain urethane, uretdione, biuret or isocyanuric acid radicals, for example. The aryl and cycloalkyl radicals can furthermore be substituted by $C_1$-$C_4$-alkyl or chlorine.

Preferred polyetherurethanes according to the invention correspond to the formula II

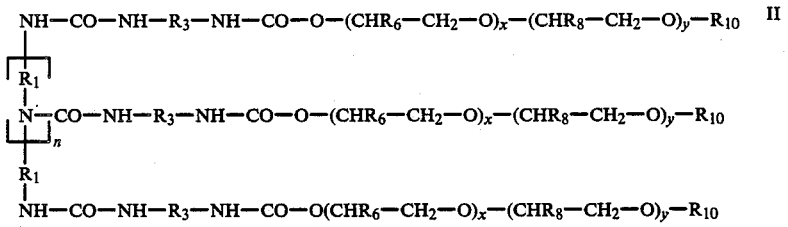

in which $R_1$ is selected from the group consisting of $C_2$ to $C_7$-alkylenes and $C_5$ to $C_7$-cycloalkylenes, $R_3$ is selected from the group consisting of $C_6$ to $C_{20}$-alkylenes, unsubstituted $C_6$-$C_{20}$-cycloalkylenes, unsubstituted $C_6$-$C_{20}$-arylenes, $C_6$-$C_{20}$-cycloalkylenes substituted by $C_1$–$C_4$-alkyl or halogen and $C_6$–$C_{20}$-arylenes substituted by $C_1$–$C_4$-alkyl or halogen, $R_6$ and $R_8$ are selected from the group consisting of hydrogen and $C_1$–$C_{20}$-alkyl, $R_{10}$ denotes $C_1$ to $C_6$-alkyl, n represents a number in the range of from 0 to 5 and x and y represent a number in the range of from 5 to 100, where the units (CHR$_6$—CH$_2$—O) and (CHR$_8$—CH$_2$—O) are present in blocks, are randomly distributed or are partly in blocks and partly randomly distributed.

In very particularly preferred polyetherurethanes accord-ing to the invention, in the formula II $R_1$ represents $C_2$ to $C_3$-alkylene, $R_3$ is selected from the group consisting of $C_6$ to $C_{13}$-alkylenes, methyl substituted $C_6$ to $C_{13}$-cycloalkenes, unsubstituted $C_6$ to $C_{13}$-cycloalkenes and $C_6$ to $C_{13}$-arylenes, $R_6$ represents hydrogen, $R_8$ represents methyl, n represents a number in the range of from 1 to 5, x represents a number in the range of from 5 to 50 and y represents a number in the range of from 5 to 40, and the units (CH$_2$—CH$_2$—O) and (CH(CH$_3$)—CH$_2$—O) are randomly distributed or are partly in blocks and partly randomly distributed.

The polyurea-modified polyetherpolyurethanes according to the invention are obtained by reaction of $(m+\mu)$-valent polyisocyanates with polyethers of the formula III

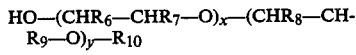

and polyamines of the formula IV

where the radicals $R_1$, $R_2$, $R_6$, $R_7$, $R_8$, $R_9$ and $R_{10}$ and the numbers m, n, x and y possess the abovementioned meaning.

The polyisocyanates used for the preparation of the polyurea-modified polyetherurethanes can be aliphatic, cycloaliphatic or aromatic. Examples of suitable polyisocyanates which may be mentioned are hexamethylene diisocyanate, cyclohexane 1,4-diisocyanate, 2,4- and 2,6-toluylene diisocyanate and their mixtures, 1-isocyanatomethyl-5-isocyanato-1,3,3-trimethylcyclohexane, (2,2,4- or 2,4,4-trimethylhexamethylene 1,6-diisocyanate), 1,5-naphthalene diisocyanate, 1,3-cyclopentylene diisocyanate, m- and p-phenylene diisocyanate, 2,4,6-toluyuene triisocyanate, 4,4',4''-triphenylmethane triisocyanate, 1,3- and 1,4-xylylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, durene diisocyanate, 1-phenoxy-2,4'-phenylene diisocyanate, 1-tert.-butyl-2,4-phenylene diisocyanate, methylene-bis-4,4'-cyclohexyl diisocyanate, 1-chloro-2,4-phenylene diisocyanate and 4,4'-diphenyl ether diisocyanate.

Furthermore, it is possible to employ higher-molecular-weight and if appropriate also more highly substituted polyisocyanates, which are prepared from lower-molecular-weight substrates by polymerization reaction to uretdiones or isocyanurate derivatives. For example, the uretdione from 2 moles of 2,4-toluylene diisocyanate and the isocyanurate ring-containing polymerization products from 2,4- and 2,6-toluylene diisocyanate or hexamethylene diisocyanate, a system containing, on average, 2 isocyanurate rings in the molecule and formed from 5 moles of toluylene diisocyanate or a corresponding derivative from, on average, 2 moles of toluylene diisocyanate and 3 moles of hexamethylene diisocyanate, may be mentioned.

It is possible by a further synthetic method to prepare higher biuret-linked systems from di- or polyisocyanates by partial hydrolysis through the stages of the carbamic acid and the amine, for example a biuret-linked compound which formally results from 3 moles of hexamethylene diisocyanate by the addition of 1 mole of water and cleavage of 1 mole of carbon dioxide.

Likewise suitable polyisocyanates are obtained by the reaction of di- or polyols with di- or polyfunctional isocyanates, if the molar ratio of hydroxyl compound to isocyanate is selected so that free NCO-functions always remain available in the randomly formed reaction products and a molecular weight of 2,000 to 3,000 is not exceeded. Similar suitable polyisocyanates are obtained from hydroxyl group-containing polyesters by reaction with excess di- or polyfunctional isocyanates.

All di- and polyisocyanates described above can be reacted in this manner, observing the prerequisites described, with di- and polyols, such as mono- and polyethylene glycol, propanediols, butanediols, neopentyl glycol and other pentanediols, adipol, hexanediols, cyclohexanediols, 1,4-dihydroxymethylcyclohexane, perhydrobrisphenol-A, glycerol, trimethylolethane, trimethylolpropane, other hexanetriols and pentaerythritol. Preferred reactions of di- and polyols with toluylene diisocyanate are those in which 1 mole of the diisocyanate is reacted per OH function.

Diisocyanates, in particular hexamethylene diisocyanate, isophorone diisocyanate, toluylene diisocyanate and diphenylmethane diisocyanate, are preferably employed as polyisocyanates.

The polyethers used for the preparation of the urea group-containing polyetherurethanes according to the invention are obtained by polyalkoxylation of alcohols, phenols and alkylphenols with up to 18 C-atoms. Herein, all saturated or unsaturated aliphatic, cycloaliphatic and araliphatic hydroxy compounds with 1–18 C-atoms, which can be employed pure or in the form of mixtures for the polyalkoxylation, are suitable as alcohols.

Alkylene oxides for polyalkoxylation are, for example, ethylene oxide, propylene oxide, 1,2- and 2,3-epoxybutane, epichlorohydrin, dodecyl oxide or stearyl oxide.

Preferred polyethers are obtained by polyalkoxylation of lower alcohols, such as methanol, ethanol, propanols, butanols, pentanols or hexanols, with ethylene oxide and propylene oxide. Herein, block polymers or polymers with random distribution of the oxyalkyl groups, so-called copolymers, or mixed forms of these two possibilities, can be prepared. Preferred polymers are copolymers and those products in which the alcohols are first converted to copolymers with a mixture of propylene oxide and 80% to 90% of the total amount of the ethylene oxide and after this the residual 10 to 20% of the ethylene oxide are introduced, so that virtually all the end groups of these polyethers are primary OH groups. Preferred polyethers contain 40 to 60% by weight of ethylene oxide, and particularly preferred polyethers are synthesized from equivalent amounts by weight of ethylene oxide and propylene oxide. Preferably, polyethers having molecular weights of 600 to 5,000, particularly preferably 700 to 3,000, are employed.

Ethylenediamine, diethylenetriamine, triethylenetetramine, tetraethylenepentamine, pentaethylenehexamine, polyethyleneimine, 1,2- and 1,3-propylenediamine, dipropylenetriamine, tripropylenetramine, butylenediamine, hexamethylenediamine, 2,5-diamino-2,5-dimethylhexane, 2,2,4- and 2,4,4-trimethyl-1,6-hexanediamine, cyclohexanediamine, isophoronediamine, hydrogenated toluylenediamine and hydrogenated diaminodiphenylmethane may be mentioned as aliphatic or cycloaliphatic amines which are suitable for the preparation of the polyurea-modified polyether polyurethanes according to the invention.

Preferred polyamines are trifunctional and more highly functional. Diethylenetriamine, triethylenetetramine, tetraethylenepentamine and pentaethylenehexamine are particularly preferred.

Industrial distillation residues from the preparation of these oligoethyleneamines are also highly suitble. These residues then contain additional branched and/or cyclic polyalkylenepolyamines.

Although the reaction of the polyisocyanates with the polyethers and the polyamines can be carried out by slowly adding a mixture of polyether and polyamine to the initially introduced polyisocyanate or, vice versa, the polyisocyanate to a mixture of polyether and polyamine, this procedure can however lead to insoluble precipitates. The reaction is therefore preferably carried out in two steps. First, the polyether is reacted with the polyisocyanate and after this the remaining isocyanate groups are reacted with the polyamine.

In the reaction of the polyether with the polyisocyanate, the polyisocyanate is advantageously initially introduced and the polyether added. For the preparation of reproducible products, it is important that the polyethers employed are always anhydrous. The reaction can be carried out in inert solvents, such as benzene, toluene, xylene, chlorobenzene, o-dichlorobenzene, acetone and ethyl acetate, or may be carried out without solvent; it is preferably carried out in the temperature range between 0° and 140° C. All catalysts which are effective in the formation of urethanes (see Houben-Weyl, Methoden der organischen Chemie [Methods of organic chemistry], Volume 14.2, page 61, 4th Edition, 1963), such as pyridine, methylpyridine, N,N'-dimethylpiperazine, N,N-dimethylbenzylamine or N,N'-endoethylenepiperazine, can be used.

Formulae I and II are idealized structures. According to the reactivity of the reactants, polymer mixtures may be formed. However, if diisocyanates containing isocyanate groups of different reactivities are employed, such as 2,4-toluylene diisocyanate or isophorone diisocyanate, then it is possible in the reaction with the polyethers to first react only the reactive isocyanate group of the molecule in high yields. The formation of the reaction product from 2 moles of polyether and 1 mole of diisocyanate in addition to 1 mole of free diisocyanate, which is possible as a side reaction, can be suppressed to a considerable extent by gentle reaction conditions, so that largely the compounds according to formulae I and II are obtained after the reaction with the polyamines.

However, if diisocyanates containing isocyanate groups of equivalent reactivity are employed, such as hexamethylene diisocyanate or 4,4'-diphenylmethane diisocyanate, then in the reaction with the polyether a reaction mixture of 1:1- and 1:2-addition products and unreacte diisocyanate is formed, which, after reaction with the polyamine, consequently leads to a product mixture of the 1:2-addition product from 1 mole of diisocyanate and 2 moles of polyether, compounds according to formula I or II an also, in particular, to higher-molecular-weight constituents. These higher-molecular-weight constituents are synthesized by reacting molecular parts in which not all NH groups of the polyamine are linked through diisocyanates with polyethers, with the free diisocyanates through the as yet unreacted NH groups to give higher-molecular-weight polyureas. Products in which the stoichiometric ratios deviate by up to 30% from the ratios given by the formulae are still well suited, however. Preferred stoichiometric ratios here are those in which the molar sum of the OH and NH groups is equivalent to that of the isocyanate groups.

As a rule, the compounds according to the invention are present in oil-soluble form. Since their activity as emulsion breakers increases with better distribution, it is sometimes advisable to add commercial emulsifiers, for example alkyl aryl sulphonates, alkyl sulphates, fatty acid salts, alkyl-phenol ethoxylates, fatty alcohol ethoxylates or the like to improve the distributability.

The present invention also relates to a method for the breaking of water-in-oil emulsions, in particular of water-in-crude oil emulsions in which polyetherurethanes of the formula (I) are used. In this case, the substances of the formula (I) are generally added in amounts of 10 to 500 ppm with respect, in each case, to the water-in-oil emulsion. In many cases, the substances of the formula (I) even act as emulsion breakers when they are employed in amounts of 10 to 50 ppm, with respect, in each case, to the water-in-oil emulsion. The emulsion disrupters according to the invention generally develop their action at temperatures from about 30° C. The emulsions are disrupted more quickly or (with equivalent times of action) more completely than with known products. Moreover, the emulsion breakers according to the invention have multiple uses.

For use as emulsion breakers for water-in-oil emulsions, in substances of the formula (I) can be employed as such. However, they can also be used as a solution in high-boiling solvents, for example as a 10 to 70% strength by weight solution in alkylaromatics, such as xylene. Preparation of the polyetherpolyurethanes according to the invention.

EXAMPLE 1

0.02 g of dibutyltin dilaurate are added to a solution of 235.9 g of a polyether of OH number 21.4, prepared by alkoxylation of butanol using equivalent amounts by weight of ethylene oxide and propylene oxide, and 15.1 g of hexamethylene diisocyanate and the mixture is stirred at 50° C. until the polyether has completely reacted (testing by isocyanate number). 3.1 g of diethylenetriamine are then added at 50° C. and subsequently allowed to react for about 8 hours. A pale yellow liquid is obtained.

EXAMPLE 2

The process is as in Example 1, in this case, however, replacing hexamethylene diisocyanate by 15.7 g of 2,4-toluylene diisocyanate.

EXAMPLE 3

A polyetherurethane is prepared according to Example 1 from 204 g of a polyether of OH number 30, prepared by alkoxylation of butanol first using 38% by weight of ethylene oxide and 52% by weight of propylene oxide and after this using 10% by weight of ethylene oxide, and 20.2 g of hexamethylene diisocyanate and 4.13 g of diethylenetriamine.

EXAMPLE 4

A polyetherurethane is prepared according to Example 1 from 255 g of a polyether of OH number 30, prepared by alkoxylation of butanol using 38% by weight of ethylene oxide and 52% by weight of propylene oxide and subsequently using 10% by weight of ethylene oxide, and 26. g of toluylene diisocyanate and 5.68 g of tetraethylenepentamine.

EXAMPLE 5

A polyetherurethane is prepared according to Example 1 from 204 g of a polyether of OH number 30, prepared by alkoxylation of butanol first using 38% by weight of ethylene oxide and 52% by weight of propylene oxide and after this using 10% by weight of ethylene oxide, and 30 g of methylene diphenyl diisocyanate and also 4.13 g of diethylenetetramine. Use of the products according to the invention for the breaking of mineral oil emulsions The following examples show that the compounds according to the invention exhibit an excellent activity in various crude oil emulsions even at low concentrations, compared with those according to the prior art.

EXAMPLE 6

Crude oil test emulsion consisting of a North German crude oil and synthetic formation water (salinity 10.9% by weight) having a water content of 30% by volume.

| | Emulsion breaker | Dosage ppm | Breaker action (separation of water in %) | | | | | |
|---|---|---|---|---|---|---|---|---|
| | | | 10 min | 30 min | 1 hr | 2 hr | 3 hr | 4 hr |
| a. | Breaker in accordance with the prior art | 20 | 3 | 13 | 24 | 27 | 33 | 33 |
| b. | Breaker in accordance with the prior art | 20 | 17 | 33 | 33 | 37 | 53 | 60 |
| c. | Product of Example 1 | 20 | 48 | 61 | 65 | 67 | 72 | 89 |
| d. | Product of Example 2 | 20 | 35 | 55 | 64 | 65 | 69 | 85 |
| e. | Product of Example 3 | 20 | 47 | 63 | 67 | 67 | 68 | 85 |
| f. | Product of Example 4 | 20 | 7 | 24 | 32 | 53 | 65 | 70 |
| g. | Product of Example 5 | 20 | 10 | 12 | 21 | 26 | 35 | 63 |
| h. | Blank value | | 0 | 0 | 0 | 0 | 0 | 0 |

The emulsion breaking occurred at a temperature of 40° C.

EXAMPLE 7

Crude oil test emulsion consisting of a Dutch crude oil and natural formation water (salinity 7.5% by weight) having a water content of 51% by volume.

| | Emulsion breaker | Dosage ppm | Breaker action (separation of water in %) | | | | | |
|---|---|---|---|---|---|---|---|---|
| | | | 10 min | 30 min | 1 hr | 2 hr | 3 hr | 4 hr |
| a. | Breaker in accordance with the prior art | 30 | 7 | 46 | 48 | 50 | 51 | 56 |
| b. | Breaker in accordance with the prior art | 30 | 1 | 3 | 25 | 33 | 41 | 47 |
| c. | Product of Example 1 | 30 | 2 | 73 | 74 | 76 | 76 | 77 |
| d. | Product of Example 2 | 30 | 8 | 65 | 67 | 67 | 78 | 69 |
| e. | Product of Example 3 | 30 | 7 | 67 | 71 | 71 | 73 | 75 |
| f. | Product of Example 4 | 30 | 9 | 69 | 71 | 73 | 74 | 75 |
| g. | Product of Example 5 | 30 | 8 | 36 | 55 | 55 | 60 | 61 |
| h. | Blank value | — | 0 | 0 | 0 | 0 | 0 | 0 |

The emulsion breaking occurred at a temperature of 60° C.

What is claimed is:

1. In a method of breaking water-in-oil emulsions comprising adding a breaker to said emulsion, the improvement wherein the breaker is a polyurea-modified polyurethane of the formula

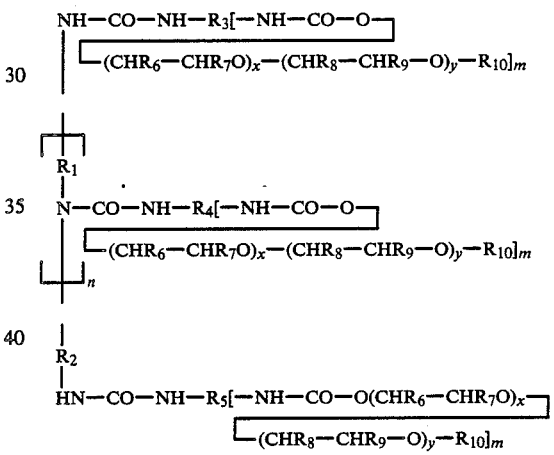

in which
  $R_1$ and $R_2$ independently of one another are selected from the group consisting of $C_2$ to $C_{14}$-alkylenes and $C_3$ to $C_{14}$-cycloalkylenes,
  $R_3$, $R_4$ and $R_5$ independently of one another are selected from the group consisting of substituted and unsubstituted alkylenes, substituted and unsubstituted cycloalkylenes and substituted and unsubstituted arylenes,
  $R_6$, $R_7$, $R_8$ and $R_9$ independently of one another are selected from the group consisting of hydrogen and $C_{1-20}$-alkyls,
  $R_{10}$ is selected from the group consisting of $C_1$ to $C_{18}$-alkyls, $C_6$ to $C_{18}$-aryls, $C_7$ to $C_{18}$-aralkyls and $C_2$ to $C_{18}$-alkenyls,
  n represents a number in the range of from 0 to 50,
  m represents a number in the range of from 1 to 4,
  x represents a number in the range of from 5 to 100 and
  y represents a number in the range of from 0 to 100.

2. In a method of breaking water-in-oil emulsions comprising adding a breaker to said emulsion, the improvement wherein the breaker is a

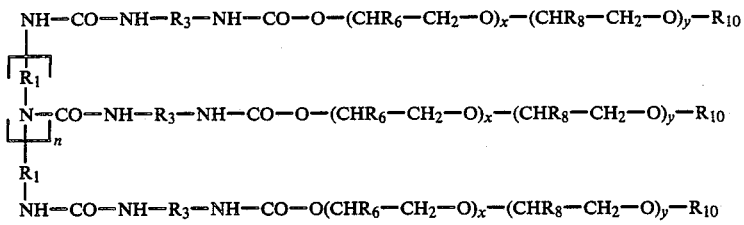

in which
- $R_1$ is selected from the group consisting of $C_2$ to $C_7$-alkylenes and $C_5$ to $C_7$-cycloalkylenes,
- $R_3$ is selected from the group consisting of $C_6$ to $C_{20}$-alkylenes, unsubstituted $C_6$-$C_{20}$-cycloalkylenes, unsubstituted $C_6$-$C_{20}$-arylenes, $C_6$-$C_{20}$-cycloalkylenes substituted by $C_1$-$C_4$-alkyl or halogen and $C_6$-$C_{20}$-arylenes substituted by $C_1$-$C_4$-alkyl or halogen,
- $R_6$ and $R_8$ are selected from the group consisting of hydrogen and $C_1$-$C_{20}$-alkyl;
- $R_{10}$ denotes $C_1$ to $C_6$-alkyl,
- n represents a number in the range of from 0 to 5 and
- x and y represent a number in the range of from 5 to 100, where the units $(CHR_6-CH_2-O)$ and $(CHR_8-CH_2-O)$ are present in blocks or are randomly distributed or are partly in blocks and partly randomly distributed.

3. A method according to claim 2, wherein
- $R_1$ represents $C_2$ to $C_3$-alkylene,
- $R_3$ is selected from the group consisting of $C_6$ to $C_{13}$-alkylenes, methyl substituted $C_6$ to $C_{13}$-cycloalkenes, unsubstituted $C_6$ to $C_{13}$-cycloalkenes and $C_6$ to $C_{13}$-arylenes,
- $R_6$ represents hydrogen, $R_8$ represents methyl,
- n represents a number in the range of from 1 to 5,
- x represents a number in the range of from 5 to 50 and
- y represents a number in the range of from 5 to 40, and the units $(CH_2-CH_2-O)$ and $(CH(CH_3)-CH_2-O)$ are randomly distributed or partly in blocks and partly randomly distributed.

* * * * *